United States Patent
Chien et al.

(10) Patent No.: US 10,516,819 B2
(45) Date of Patent: Dec. 24, 2019

(54) ELECTRONIC DEVICE WITH MULTIPLE LENSES AND LENS SWITCHING METHOD

(71) Applicant: Chiun Mai Communication Systems, Inc., New Taipei (TW)

(72) Inventors: How-Wen Chien, New Taipei (TW); Sung-Chieh Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 86 days.

(21) Appl. No.: 15/697,025

(22) Filed: Sep. 6, 2017

(65) Prior Publication Data
US 2018/0070005 A1    Mar. 8, 2018

(30) Foreign Application Priority Data
Sep. 7, 2016  (CN) .......................... 2016 1 0807259

(51) Int. Cl.
*H04N 5/232* (2006.01)
*G02B 7/02* (2006.01)
*G02B 7/28* (2006.01)
*G03B 13/36* (2006.01)

(52) U.S. Cl.
CPC ......... *H04N 5/23212* (2013.01); *G02B 7/021* (2013.01); *G02B 7/282* (2013.01); *G03B 13/36* (2013.01); *G03B 2205/0046* (2013.01)

(58) Field of Classification Search
CPC ............. H04N 5/23212; H04N 5/2254; H04N 5/23209; H04N 5/232121; H04N 5/232122; H04N 5/232123; H04N 5/232125; H04N 5/232127; H04N 5/232133; G03B 13/36; G03B 2205/0046; G02B 7/021; G02B 7/282

USPC ....... 348/294–324, 335, 340, 345, 348, 350, 348/352

See application file for complete search history.

(56) References Cited

U.S. PATENT DOCUMENTS

| | | | | |
|---|---|---|---|---|
| 5,055,932 A | * | 10/1991 | Hijikata ................. | G02B 7/102 348/347 |
| 2012/0147251 A1 | * | 6/2012 | Matsuzawa ............ | G02B 15/14 348/345 |

FOREIGN PATENT DOCUMENTS

| | | |
|---|---|---|
| CN | 103293824 A | 9/2013 |
| CN | 104363379 A | 2/2015 |
| JP | 2010-271696 A | 12/2010 |
| TW | M277956 | 10/2005 |
| TW | 200736811 A | 10/2007 |
| TW | 201507470 A | 2/2015 |

* cited by examiner

*Primary Examiner* — Yogesh K Aggarwal
(74) *Attorney, Agent, or Firm* — ScienBiziP, P.C.

(57) ABSTRACT

An electronic device able to automatically select one of a plurality of lenses includes a lens module, an image sensor, a focusing module, and a processor. The lens module includes a standard lens, a macro lens, and a telephoto lens. The image sensor captures images and the focusing module controls the lenses to automatically focus on the object. The processor selects the standard lens as a current lens, obtains a first focusing distance at a first moment and a second focusing distance at a second moment, and determines to switch the current lens or not to switch according to a comparison of the first and second focusing distances. The second moment is later than the first moment. A lens switching method is also provided.

12 Claims, 2 Drawing Sheets

ELECTRONIC DEVICE WITH MULTIPLE LENSES AND LENS SWITCHING METHOD

FIELD

The subject matter herein generally relates to image capture.

BACKGROUND

Portable electronic devices can include a camera module for capturing pictures. Typically, the camera module includes only one original lens. When capturing close up images of an object is necessary, there is often a need to switch to another lens. The original lens typically has a slow focusing speed and a not so high focusing precision, which need improvements.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
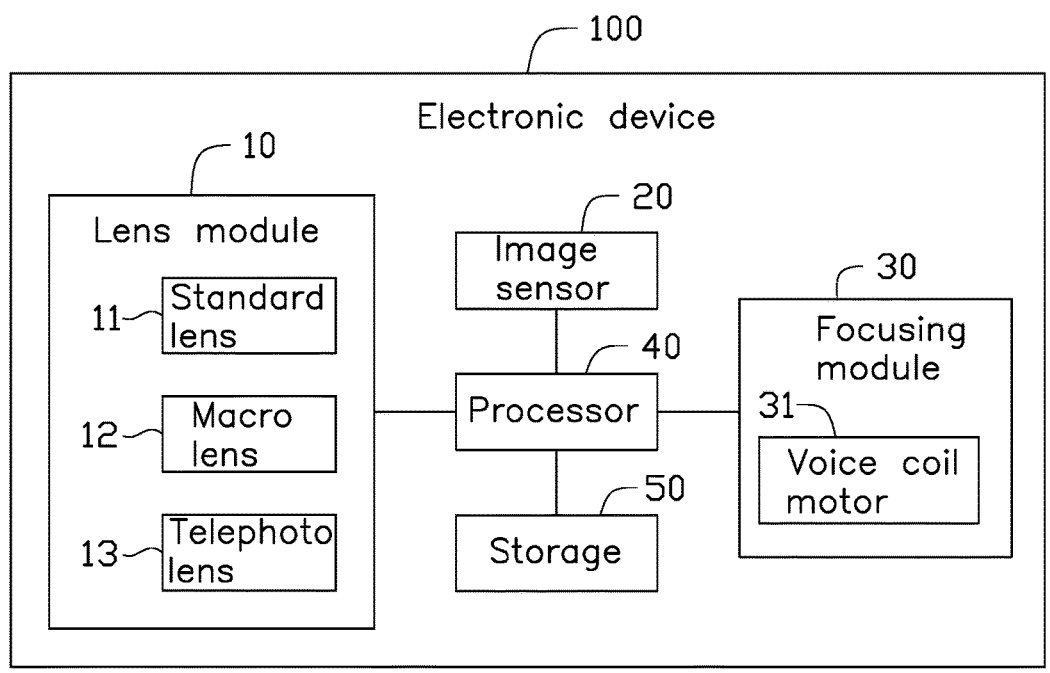
FIG. 1 is a block diagram of one exemplary embodiment of an electronic device with multiple lenses.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates one exemplary embodiment of an electronic device 100. The electronic device 100 can be, but is not limited to, a mobile phone, a personal digital assistant, or a tablet computer. The electronic device 100 includes a lens module 10, an image sensor 20, a focusing module 30, a processor 40, and a storage 50. The lens module 10, the image sensor 20, the focusing module 30, and the storage 50 are electrically connected to the processor 40.

In general, the word "module," as used herein, refers to logic embodied in hardware or firmware, or to a collection of software instructions, written in a programming language, such as, Java, C, or Assembly. One or more software instructions in the modules may be embedded in firmware, such as erasable-programmable read-only memory (EPROM). The modules described herein may be implemented as either software and/or hardware modules and may be stored in any type of computer-readable medium or other storage device.

The lens module 10 includes a standard lens 11, a macro lens 12, and a telephoto lens 13. The standard lens 11 is used for capturing images in a normal distance. The macro lens 12 is used for capturing images close to the subject. The telephoto lens 13 is used for capturing images from a long distance. A wide angle of the telephoto lens 13 is smaller than a wide angle of the standard lens 11.

The image sensor 20 is used for capturing images through the standard lens 11, the macro lens 12, and the telephoto lens 13.

The focusing module 30 is used for controlling the standard lens 11, the macro lens 12, and the telephoto lens 13 to automatically focus and capture clear images. The focusing module 30 includes a voice coil motor 31 used for driving the standard lens 11, the macro lens 12, and the telephoto lens 13 to focus distance.

Figure 2:
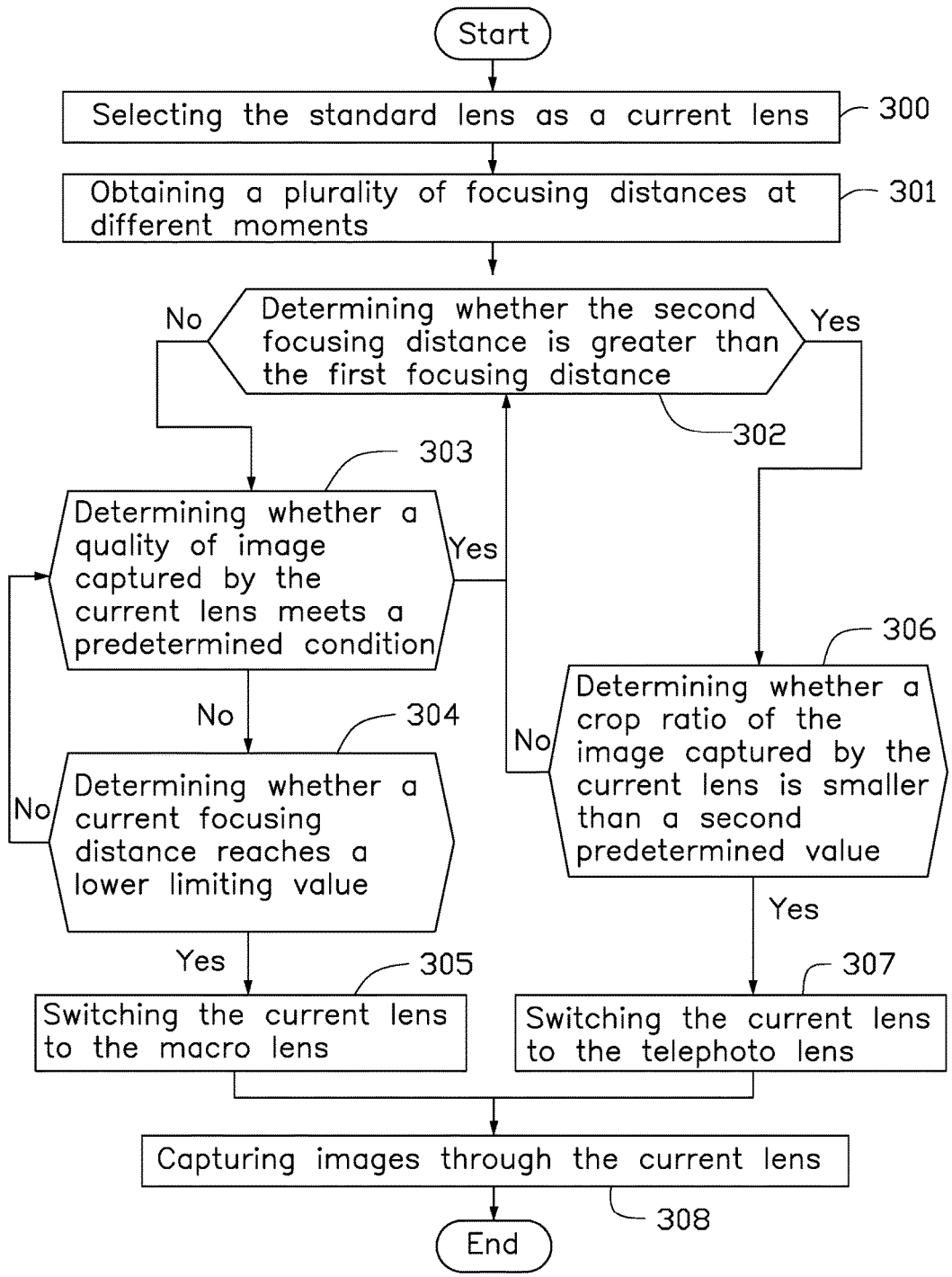
FIG. 2 is a flow chart of one exemplary embodiment of a lens switching method.

The storage 50 is used for storing applications and data for the electronic device 100, such as an application controlling the processor 40 to process the lens switching method as shown in FIG. 2. The storage 50 also stores data of a first focusing distance, a second focusing distance, a predetermined condition of an image quality, and a preset value of crop ratio generated in the lens switching method in FIG. 2.

The processor 40 can be a single chip microcomputer or other micro integrated circuits. The storage 50 can be a memory of the electronic device 100 or an external storage device, such as a Smart Media Card, a Secure Digital Card, or a Random-Access Memory (RAM), connected to the electronic device 100.

Referring to FIG. 2, a flowchart is presented in accordance with an example embodiment which is being illustrated. The example lens switching method can be carried out using the configurations illustrated in FIG. 1, for example, and various elements of these figures are referenced in example method. Each block shown in FIG. 2 represents one or more processes, methods or subroutines, carried out in the exemplary method. Furthermore, the illustrated order of blocks is by example only and the order of the blocks can change according to the present disclosure. Additional blocks may be added or fewer blocks may be utilized, without departing from this disclosure. The exemplary method can begin at block 300.

At block 300, the processor 40 selects the standard lens 11 as a current lens. In other exemplary embodiments, when the electronic device 100 presets the standard lens 11 as a current lens, the step of block 300 can be omitted.

At block 301, the processor 40 obtains a plurality of focusing distances at different moments through the focusing module 30. The focusing distance is a distance between the lens module 10 and an object being captured. For instance, the processor 40 obtains a first focusing distance at a first moment and a second focusing distance at a second moment, the second moment is later than the first moment.

In at least one embodiment, the focusing module 30 may obtain the focusing distances by one of the following ways: laser ranging, estimating the focusing distance by a sharpness of the object edge in the image obtained by the image sensor 20, and estimating the focusing distance by obtaining a depth of field of two of the lenses in the lens module 10.

At block 302, the processor 40 compares the second focusing distance and the first focusing distance. When the second focusing distance is smaller than the first focusing distance, this indicates that the focusing distance is decreasing and the user is approaching the object being captured at a close distance. Herein, the procedure goes to block 303, the processor 40 determines whether the current lens is suitable for capturing in the current distance and whether switching to the macro lens 12 is needed.

When the second focusing distance is greater than the first focusing distance, this indicates that the focusing distance is increasing and the user is approaching capture at a long distance. Thus, the procedure goes to block 306, the processor 40 determines whether the standard lens 11 is suitable for capturing in the current distance and whether switching to the telephoto lens 13 is needed.

At block 303, the processor 40 determines whether a quality of the image captured by the current lens meets a predetermined condition. When the quality of the image captured by the current lens meets the predetermined condition, this indicates that the current lens is suitable for the current distance, and switching of the current lens is not required, and the procedure goes back to block 302. When the quality of image captured by the current lens does not meet the predetermined condition, this indicates that the current lens is not suitable for the current distance, and the procedure goes to block 304. In at least one embodiment, the predetermined condition can be that a value of a contrast or a value of a sharpness of the image captured by the current lens is greater than a first predetermined value.

At block 304, the processor 40 further determines whether a current focusing distance reaches a lower limit value of a focusing distance of the lens module 10. When the current focusing distance reaches the lower limit value, the current lens is determined as being no longer suitable for capturing images that meet the predetermined condition by automatic focusing, thus switching to the macro lens 12 is needed, and the procedure goes to block 305. When the current focusing distance does not reach the lower limit value, this indicates that the current lens is still suitable for capturing images and meeting the predetermined condition by automatic focusing, thus no switch is needed, and the procedure goes back to block 303.

At block 305, the processor 40 switches the current lens to the macro lens 12.

At block 306, the processor 40 determines whether a crop ratio of the image captured by the current lens is smaller than a second predetermined value. The image captured by the current lens is a sub-image cropped from an original image captured by the image sensor 20 and then enlarged. The crop ratio is the ratio of the size of the cropped sub-image to the size of the original image. The size, for example, can be the area of the original image. When the crop ratio is greater than or equal to the second predetermined value, the current lens is determined as meeting user's requirement, and there is no need to switch the current lens, and the procedure goes back to block 302. When the crop ratio is smaller than the second predetermined value, the current lens is determined as unable to meet user's requirement, and the procedure goes to block 307.

At block 307, the processor 40 switches the current lens to the telephoto lens 13.

At block 308, the image sensor 20 captures images through the current lens.

The electronic device 100 and the lens switching method may automatically switch to the macro lens 12 or the telephoto lens 13 according to user's requirements, enabling better quality images.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An electronic device, comprising:
a lens module comprising a plurality of lenses including a standard lens, a macro lens, and a telephoto lens;
an image sensor capturing images of an object through one of the lenses;
a focusing module comprising a voice coil motor for driving the standard lens, the macro lens, and the telephoto lens to automatically focus on the object; and
a processor electrically connected to and controlling the lens module, the image sensor, and the focusing module, the processor selecting the standard lens as a current lens, obtaining a first focusing distance at a first moment and a second focusing distance at a second moment, and determining whether switching the current lens to one of the macro lens and the telephoto lens according to a comparison of the second focusing distance and the first focusing distance;
wherein the second moment is later than the first moment; and
wherein when the second focusing distance is greater than the first focusing distance, the processor further determines whether a crop ratio of the image captured by the current lens is smaller than a second predetermined value; wherein when the crop ratio is greater than or equal to the second predetermined value, the processor does not switch the current lens; wherein when the crop ratio is smaller than the second predetermined value, the processor switches the current lens to the telephoto lens.

2. The electronic device as claimed in claim 1, wherein when the second focusing distance is smaller than the first focusing distance, the processor further determines whether switching the current lens to the macro lens; wherein when the second focusing distance is greater than the first focusing distance, the processor further determines whether switching the current lens to the telephoto lens.

3. The electronic device as claimed in claim 1, wherein when the second focusing distance is smaller than the first focusing distance, the processor further determines whether a quality of the image captured by the current lens meets a predetermined condition; wherein when the quality of the image captured by the current lens meets the predetermined condition, the processor does not switch the current lens; when the quality of the image captured by the current lens does not meet the predetermined condition, the processor further determines whether switching the current lens to the macro lens.

4. The electronic device as claimed in claim 3, wherein when the quality of the image captured by the current lens does not meet the predetermined condition, the processor further determines whether a current focusing distance reaches a lower limit value of a focusing distance of the lens module; wherein when the current focusing distance reaches the lower limit value, the processor switches the current lens to the macro lens; when the current focusing distance does not reach the lower limit value, the processor does not switch the current lens.

5. The electronic device as claimed in claim 3, wherein the predetermined condition is a value of a contrast or a value of a sharpness of an image captured by the current lens is greater than a first predetermined value.

6. The electronic device as claimed in claim 1, wherein the image captured by the current lens is a sub-image cropped from an original image captured by the image sensor and then enlarged, the crop ratio is a ratio of a size of the cropped sub-image to a size of the original image.

7. A lens switching method applied in an electronic device, the lens switching method is stored in a storage of the electronic device and operated by a processor of the electronic device, the lens switching method comprising:
  selecting a standard lens as a current lens;
  obtaining a first focusing distance at a first moment and a second focusing distance at a second moment; and
  determining whether switching the current lens to a macro lens or a telephoto lens according to a comparison of the second focusing distance and the first focusing distance;
  wherein the second moment is later than the first moment; and
  wherein when the second focusing distance is greater than the first focusing distance, further determining whether a crop ratio of an image captured by the current lens is smaller than a second predetermined value; wherein when the crop ratio is greater than or equal to the second predetermined value, the current lens is not switched; wherein when the crop ratio is smaller than the second predetermined value, switching the current lens to the telephoto lens.

8. The lens switching method as claimed in claim 7, wherein when the second focusing distance is smaller than the first focusing distance, further determining whether switching the current lens to the macro lens; wherein when the second focusing distance is greater than the first focusing distance, further determining whether switching the current lens to the telephoto lens.

9. The lens switching method as claimed in claim 7, wherein when the second focusing distance is smaller than the first focusing distance, further determining whether a quality of the image captured by the current lens meets a predetermined condition; wherein when the quality of the image captured by the current lens meets the predetermined condition, the current lens is not switched; wherein when the quality of the image captured by the current lens does not meet the predetermined condition, further determining whether switching the current lens to the macro lens.

10. The lens switching method as claimed in claim 9, wherein when the quality of the image captured by the current lens does not meet the predetermined condition, further determining whether a current focusing distance reaches a lower limit value of a focusing distance of the lens module; wherein when the current focusing distance reaches the lower limit value, switching the current lens to the macro lens; wherein when the current focusing distance does not reach the lower limit value, the current lens is not switched.

11. The lens switching method as claimed in claim 9, wherein the predetermined condition is a value of a contrast or a value of a sharpness of an image captured by the current lens is greater than a first predetermined value.

12. The lens switching method as claimed in claim 7, wherein the image captured by the current lens is a sub-image cropped from an original image captured by the image sensor and then enlarged, the crop ratio is a ratio of a size of the cropped sub-image to a size of the original image.

* * * * *